(12) United States Patent
Ranganathan et al.

(10) Patent No.: US 7,844,787 B2
(45) Date of Patent: Nov. 30, 2010

(54) TECHNIQUES FOR DATA REPLICATION WITH SNAPSHOT CAPABILITIES

(75) Inventors: Shyamsundar Ranganathan, Karnataka (IN); Kalidas Balakrishnan, TamilNadu (IN)

(73) Assignee: Novell, Inc., Provo, UT (US)

( * ) Notice: Subject to any disclaimer, the term of this patent is extended or adjusted under 35 U.S.C. 154(b) by 397 days.

(21) Appl. No.: 11/823,426

(22) Filed: Jun. 27, 2007

(65) Prior Publication Data

US 2008/0148000 A1 Jun. 19, 2008

(30) Foreign Application Priority Data

Dec. 18, 2006 (IN) .................. 2700/DEL/2006

(51) Int. Cl.
*G06F 12/00* (2006.01)
(52) U.S. Cl. ................ 711/162; 711/E12.082
(58) Field of Classification Search .......... 711/162
See application file for complete search history.

(56) References Cited

U.S. PATENT DOCUMENTS

| | | | | |
|---|---|---|---|---|
| 5,592,618 | A * | 1/1997 | Micka et al. ........... | 714/54 |
| 5,835,953 | A | 11/1998 | Ohran | |
| 5,950,198 | A | 9/1999 | Falls et al. | |
| 6,047,312 | A | 4/2000 | Brooks et al. | |
| 6,182,198 | B1 | 1/2001 | Hubis et al. | |
| 6,477,583 | B1 * | 11/2002 | Zayas et al. ........... | 709/248 |
| 6,578,041 | B1 * | 6/2003 | Lomet ............... | 707/102 |
| 6,671,688 | B1 | 12/2003 | Nikols et al. | |
| 6,957,221 | B1 | 10/2005 | Hart et al. | |
| 6,973,464 | B1 | 12/2005 | Gao | |
| 7,072,911 | B1 | 7/2006 | Doman et al. | |
| 7,412,576 | B2 * | 8/2008 | Yagawa ............... | 711/161 |
| 7,546,364 | B2 * | 6/2009 | Raman et al. ......... | 709/224 |
| 2003/0220935 | A1 * | 11/2003 | Vivian et al. .......... | 707/102 |
| 2004/0267836 | A1 | 12/2004 | Armangau et al. | |
| 2006/0123210 | A1 * | 6/2006 | Pritchett et al. ....... | 711/162 |
| 2006/0161746 | A1 | 7/2006 | Wong et al. | |
| 2006/0236047 | A1 | 10/2006 | Shitomi | |

OTHER PUBLICATIONS

"Replication Manager/SE", http://www.emc.com/products/storage_management/replication_mgr_se/, EMC Corporation,(2006).
"SnapMirror Software", http://www.netapp.com/products/software/snapmirror.html, Network Appliance, Inc.,(2006).

* cited by examiner

*Primary Examiner*—Reginald G Bragdon
*Assistant Examiner*—Hamdy S Ahmed
(74) *Attorney, Agent, or Firm*—Schwegman, Lundberg & Woessner, P.A.

(57) ABSTRACT

Techniques for data replication are presented. A snap shot request is processed within an environment associated with a local volume by flushing pending Input/Output (I/O) operations into an event packet. The event packet is sent to a replicated volume and processed against the replicated volume to create a snap shot version of the local volume.

16 Claims, 3 Drawing Sheets

TECHNIQUES FOR DATA REPLICATION WITH SNAPSHOT CAPABILITIES

RELATED APPLICATIONS

The present application claims priority to India Patent Application No. 2700/DEL/2006 filed in the India Patent Office on Dec. 18, 2006 and entitled "TECHNIQUES FOR DATA REPLICATION WITH SNAPSHOT CAPABILITIES;" the disclosure of which is incorporated by reference herein.

FIELD

The invention relates generally to data processing and more particularly to data replication.

BACKGROUND

Data is often collected, organized, and indexed for virtually every transaction and communication that occurs in today's global economy. This information has become vital to enterprises and individuals. Consequently, a variety of techniques for securing, backing up, and replicating information exists in the industry.

With data replication, the concern is to ensure that information is highly available should a central source fail or become unavailable for a variety of other reasons, such as planned power outages, network upgrades, software upgrades, etc. A variety of techniques can be used to synchronize one master data source with another remote data source. If done properly when the master data source is unavailable, services and users can still seamlessly access the remote data source with uninterrupted service. Thus not only is information secured and backed up, information is also intended to be available twenty-four hours a day, seven days a week, and 365 days a year.

Additionally, information can be time-sensitive or time dependent, meaning at a particular point in time the state of a collection of information is meaningful. A particular temporal version of a collection of data may be used for a variety of purposes, such as recreating a problem in one or more software services just before an abnormal termination occurred, ensuring a financial transaction recorded properly, recovering an earlier version of a document or of a database to acquire original information that may now be desired, producing evidence to support a cause or action where the evidence (data) may have subsequently changed, reconstructing a chronology or history for information, etc.

When an enterprise or individual desires to capture a particular time or context dependent version of a collection of information, a snapshot of the information is created at the instant or within the context desired. If a local data source where a snapshot is being created is also being replicated for high availability, then the snapshot operation can be particularly costly in terms of processing throughput and storage. Typically, applications and memory being used by the applications have to be flushed and a snapshot created on the local data source. Next, the snapshot on the local data source is transferred over a network connection to the remote replicated source. This utilizes storage for the snapshot on the local source and the remote source and may unnecessarily delay the continued processing of the applications; it may also unduly tie up network bandwidth during the snapshot transfer for the local source to the remote replicated source.

Thus, it is advantageous to improve the techniques associated with replicating data having snapshot capabilities.

SUMMARY

In various embodiments, techniques for data replication are provided. More specifically, and in an embodiment, a method for initiating a snapshot operation on a replicated volume is presented. A data snapshot request is raised to one or more applications. A flush is received of current pending volatile Input/Output (I/O) operations from the one or more applications. Next, an event packet is produced representing the pending up to data source state of a local volume that processed the volatile I/O operations, and the event packet is sent to a remote replication service. The remote replication service produces a snapshot version of a local volume in a replicated volume by processing the event packet against the remote replication volume.

DETAILED DESCRIPTION

Figure 1:
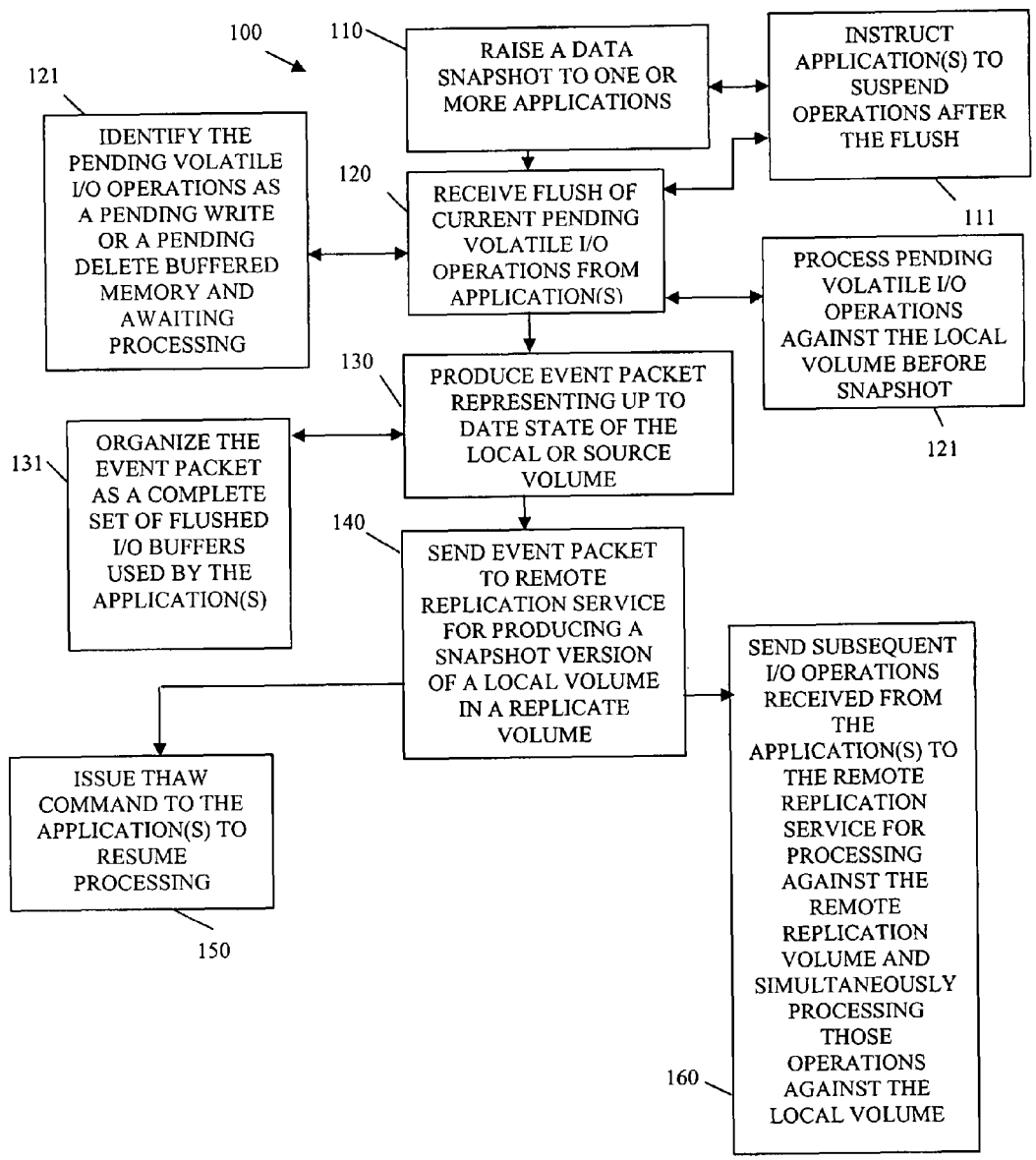
FIG. 1 is a diagram of a method for initiating a snapshot operation on a replicated volume, according to an example embodiment.

As used herein "snapshot" refers to a temporal dependent view of a collection of data. In other words, a data source and applications operating on data being housed in the data source may have a given state of the data as it exists at a particular instant in time captured as a snapshot.

A "data source" refers to a volume or collection of volumes that house the data for applications. An "application" refers to a set of software instructions, a service, or a system that interacts with data housed at the data source.

A "replicated volume" or "replicated source" refers to a mirror of a local volume or local data source. That is, the replicated volume is a remote data source that is external to a local volume and that is being kept in synchronization with the local volume via some mechanism, such as synchronous block-based data replication.

The terms "local," "remote," "source," and "destination" are relative, which means that when something is designated as being "local" or a "source" than this refers to an entity or resource operating within the environment in which the applications operate against the master data source and volume. Conversely, when something is designated as being "remote" or a "destination" than this refers to an entity or resource operating within an environment where the replicated volume is being maintained.

A "volatile" Input/Output (I/O) operation refers to an operation that alters (creates, destroys, or modifies) data housed in a data source or volume. Examples of volatile I/O operations include writes and deletes. In some cases, a write may be viewed as a delete.

A "flush" operation refers to processing information contained in memory, a buffer, or a data structure. A complete flush operating processes all information or operations included within the memory, buffers, and/or data structures and thereby clears the memory, buffers, or data structures. Generally, a "flush" is associated with flushing data from cache (type of memory); but, this does not have to always be the case as a "flush" may occur on data or operations housed in any buffer or data structure.

A "thaw" command or operation refers to an instruction issued to the applications indicating that the applications may begin normal processing. As will be described more completely below, the applications may from time to time be suspended or frozen from any further processing until other processing completes or is acknowledged thus, a "thaw" command permits the applications to resume from a current suspend state of operation.

An "event packet" is a type of data structure used by the services and systems presented herein and below. The event packet represents the up to date state of the local data source or volume. An event packet is generated when a snapshot request is received.

Various embodiments of this invention can be implemented in existing network architectures, directory services, security systems, storage interfaces, operating systems, file systems, backup systems, replication systems, and/or communication devices. For example, in some embodiments, the techniques presented herein are implemented in whole or in part in the Novell® network services, proxy server products, email products, operating system products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

FIG. 1 is a diagram of a method 100 for initiating a snapshot operation on a replicated volume, according to an example embodiment. The method 100 (hereinafter "local replication service") is implemented in a machine-accessible and readable medium. The local replication service is operational over and processes within a network. The network may be wired, wireless, or a combination of wired and wireless. The service may be implemented as instructions that when accessed by a machine performs the processing depicted in the FIG. 1.

Conventionally, when data is being replicated to a remote volume, and a snapshot request is received, the local volume first creates its own version of the snapshot and carves this out of its local volume or storage. The local snapshot version is then sent to the remote volume where it is used to create a copy of the snapshot carved from the remote volume or storage. This as was described above, is inefficient, since there is no real need for the local volume or local source environment to be concerned with and have to manage the snapshot and since it creates excessive use of space, processing cycles, and network bandwidth; and even unduly delays operations of the applications processing within the local source environment.

The local replication service in cooperation with a remote replication service (described below with reference to the method 200 of the FIG. 2) remedy this problem by creating the snapshot on just the remote volume and by minimizing processing actions, network bandwidth usage, and application delays.

With this context, the processing of the local replication service is now discussed with reference to the FIG. 1.

At 110, the local replication service raises a data snapshot request command to one or more applications processing within a local source environment. It is noted that the local replication service also processes within the local source environment and manages or facilitates access to a local volume or data source. The local replication service also communicates over a network connection to a remote replication service (discussed with the FIG. 2 below) that maintains and manages a remote volume as a replica of the local volume.

The applications may be viewed as file systems or directory services that sit on top of the local volume or operating system (OS). Higher level applications during the course of their processing produce I/O operations to access data blocks housed in the local volume. The file system or directory services may cooperate with caching or buffering services to supply some information via cache when non volatile I/O is performed, such as read operations. The file system or directory services also buffer volatile I/O operations in memory and batch write them to the local volume periodically or as needed. This arrangement improves the processing throughput of the applications (including the higher level end-user applications) and improves access response associated with reading and writing to the local volume.

The snapshot request may have originated from a variety of sources. For instance, it may be that an administrator issued a command from an end-user application to produce a snapshot version of the local volume. It may also be that a daemon or other automated scheduling application is configured to periodically initiate a snapshot request. Still further, policy that identifies events may automatically drive applications to raise the snapshot request. Once the local replication service detects the presence of the snapshot request it is communicated to the applications. It is noted that the local replication service may simply pass through an OS command or some other command that identifies the snapshot request to the applications. Thus, the local replication service does not have to produce or originate the snapshot request which is ultimately recognized and processed by the applications.

According to an embodiment, at 111, the snapshot request or another instruction from the local replication service may direct the applications to immediately flush there volatile I/O operations from memory to the local volume and after that flush suspend all processing until further notice. This permits the local replication service to arrange for a snapshot version of the local volume that includes pending I/O housed in memory to be recorded and noted in a snapshot that is recorded remotely with a replication volume and not with the local volume. The applications suspend operations until instructed otherwise so that the snapshot can be formulated and at least initiated before other volatile I/O operations begin to appear within the applications and the local environment.

At 120, the local replication service receives a flush of the current pending I/O operations from the applications in response to the initial data snapshot request, which was raised to the applications. In an embodiment, at 121, the local replication service may identify these volatile I/O operations as pending and buffered write and/or delete operations that the applications have not yet flushed to the local volume and that were being batched for processing in memory when the snapshot request was received. In other words, these I/O operations were awaiting processing against the local volume and are not recorded in the local volume or replicated to the remote volume.

At 121, the local replication service processes the pending volatile I/O before the event packet is raised. This is not done to create a snapshot; although if desired it could be; rather, this is done to bring the local volume up to date before subsequent processing from the applications further alters the state of the data housed in the local volume.

At 130, the local replication service produces an event packet that represents the up to data state of the local source volume with respect to the one or more applications including flushed versions of the pending volatile I/O operations. At 131, the local replication service organizes the pending volatile I/O operations as a complete set of flushed I/O buffers being used by the applications when the snapshot request was made. The event packet may identify the data blocks and operations to perform on each data block in the data structure to represent the I/O operations.

At 140, the local replication service sends the event packet to a remote replication service. The remote replication service on receipt of the event packet knows that it is to generate a snapshot from the existing replicated volume and flush the pending I/O of the remote replication volume so that the local source volume and the remote replication volume are in a same state with respect to the event packet generation. The processing of the remote replication service is described more completely below with reference to the FIG. 2. Upon receipt of the event packet, the remote replication service sends an acknowledgment back to the local replication service. It is noted, that the event packet does not have to be completely processed or even started when the acknowledgment is sent. The acknowledgment simply means that the remote replication service received the event packet and will process accordingly.

Once an acknowledgment is received by the local replication service, at 150, the local replication service issues a thaw command to the applications to resume normal processing. The thaw command effectively unfreezes to resumes the processing of the applications, which were suspended or frozen after the flush.

At 160, the local replication service may also (after receiving the remote replication acknowledgement) send any subsequent I/O operations received from the applications, which have resumed normal processing after the flush, to the remote replication service for processing against the remote replication or replicated volume. The remote replication service may or may not be finished processing the snapshot; but the subsequent operations can still be noted and housed in cache for processing in the proper order once the snapshot is completed. Moreover, simultaneous to sending the subsequent I/O, the local replication service processes the subsequent I/O against the local volume.

Figure 2:
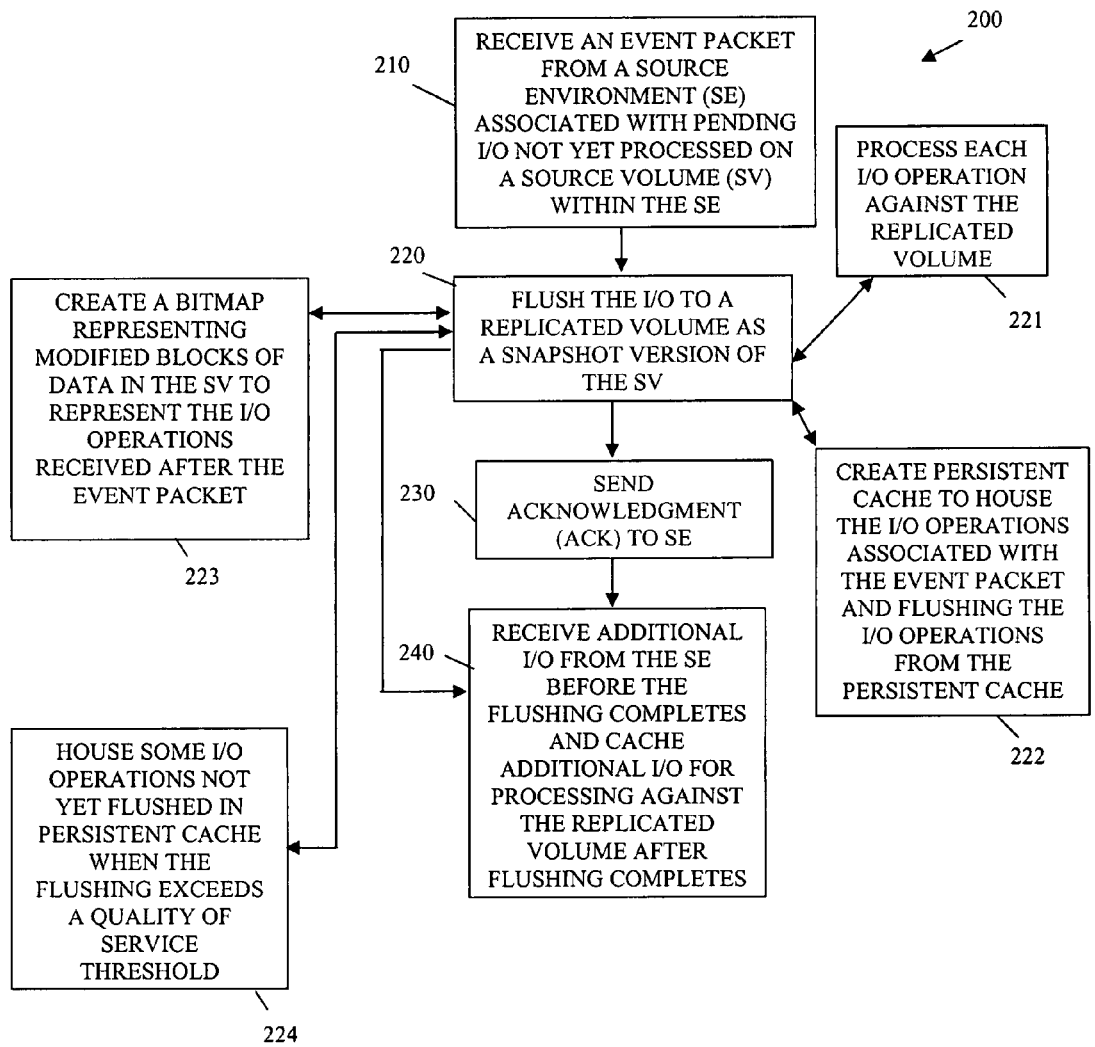
FIG. 2 is a diagram of a method for producing a snapshot on a replicated volume, according to an example embodiment.

FIG. 2 is a diagram of a method 200 for producing a snapshot on a replicated volume, according to an example embodiment. The method 200 (hereinafter "remote replication service") is implemented in a machine-accessible and readable medium and is operational over a network. The network may be wired, wireless, or a combination of wired and wireless. The remote replication service is implemented as instructions that when executed by a machine perform the processing depicted in the FIG. 2. The remote replication service cooperates with output and data structures produced by the local replication service represented by the method 100 and depicted in the FIG. 1 above.

The processing described above with respect to the local replication service represented by the method 100 of the FIG. 1 is a front-end interface to the remote replication service. That is, the local replication service manages a local or source environment associated processing applications and their data housed in a source or local volume and communicates volatile I/O as well as snapshot requests over a network connection to the remote replication service. The remote replication service manages a replica (replicated or replication volume) of the local volume remotely from the local environment and creates and manages snapshot versions of the local environment.

At 210, the remote replication service receives an event packet data structure from a source environment (local environment) via a local replication service. The event packet is associated with pending I/O that has just been or recently flushed and processed against the local volume in response to a snapshot request. In other words, pending volatile I/O batched in memory buffers when a snapshot request was received are represented in the event packet. The event packet may identify the data blocks, block offsets, and operations to perform on these locations within the replicated volume.

At 220, the remote replication service flushes the I/O represented by the event packet to the replicated volume to carve and create a snapshot version of the source or local volume as of the time in which the snapshot request was issued within the source environment.

To do the flush, at 221, each I/O operation defined in the event packet is processed against the replicated volume in a proper sequence defined by the event packet. The result of these actions is a production of a snapshot version of the local or source volume, which the remote replication service maintains and manages for subsequent access as needed or desired.

At this point a variety of scenarios may be presented for the remote replication service to handle. For example, at 222, the remote replication service may have the ability and configuration to establish and create a persistent cache to house the subsequent I/O operations after the event packet generation and may serially flush out and process each I/O operation from the persistent cache. This permits subsequent I/O received from the source environment to be buffered within the cache and processed in proper order and upon completion of the snapshot.

In another case, at 223, the remote replication service may not have the configuration or memory for a cache. In such situations a bitmap data structure may be created and used. The bitmap represents the modified blocks of the local volume after the event packet I/O generation. The actual operation or data for these blocks may be serially acquired or processed using the bitmap by contacting the local replication service asking for data for the changed blocks when needed. Thus, the I/O operations are flushed from the bitmap rather than from a cache; again, this may be done for a variety of reasons such as the expense and maintenance associated with a cache.

At 224, the remote replication service may house some of the operations not yet flushed in the persistent cache when the flushing process to the replicated volume exceeds a quality of service threshold. That is, the device or environment associated with the remote replication service may be performing other services and these other services may be impacted by the snapshot's performance. Thus, quality of service thresholds may be established and if reached the I/O operations not yet flushed may be housed and buffered in a persistent cache to free up I/O and processing cycles for other services. These cached I/O operations are eventually processed in the proper order to produce the snapshot version.

At 230, the remote replication service sends an acknowledgment to the source environment (via the local replication service) before the flushing actually completes. This permits the local replication service to thaw the applications to produce additional I/O that may affect the replicated volume and the local volume. This reduces delay while the snapshot request is being processed.

At 240, the remote replication service may also receive additional I/O from the source environment (via the local or source replication service) before the flushing has completed. The additional I/O is cached for eventual processing against the replicated volume after the flushing finally completes in its entirety.

Figure 3:
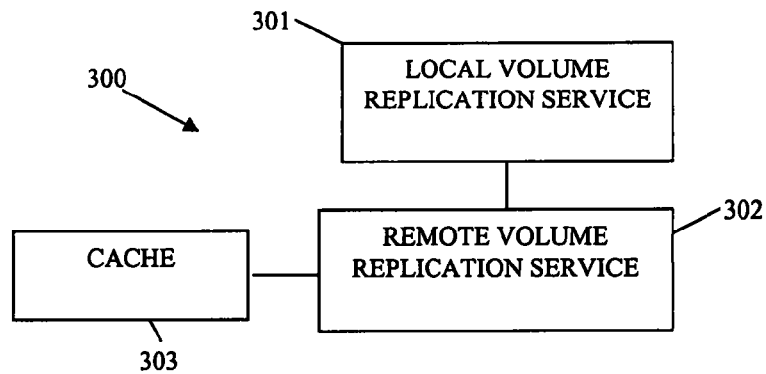
FIG. 3 is a diagram of data replication system, according to an example embodiment.

FIG. 3 is a diagram of data replication system 300, according to an example embodiment. The data replication system 300 is implemented in a machine-accessible and readable medium and is operational over a network. The network may be wired, wireless, or a combination of wired and wireless. The data replication system 300 implements, among other things, the processing associated with the local replication service represented by the method 100 of the FIG. 1 and the remote replication service represented by the method 200 of the FIG. 2.

The data replication system 300 includes a local volume replication service 301 and a remote volume replication service 302. In some cases, the data replication system 300 may also include a cache 303. Each of these and their interactions with one another will now be discussed in turn.

Example processing associated with the local volume replication service 301 was presented above with respect to the method 100 of the FIG. 1. Specifically, the local volume replication service 301 is responsible for facilitating I/O to a local volume for processing applications, communicating I/O as it is processed against the local volume to the remote volume replication service 302, communicating snapshot requests raised to the applications to the remote volume replication service 302 via production of an event packet, and thawing applications after the applications flush pending I/O from memory buffers in response to a snapshot request.

The local volume replication service 301 also processes I/O operations flushed against the local volume before the event packet I/O is communicated to the remote volume replication service 302.

The local volume replication service 301 raises snapshot requests to applications within the source environment. The requests instruct the applications to flush pending memory buffers of volatile I/O operations not yet processed to the local volume. The request also informs the applications to freeze or suspend operations until a thaw command is issued from the local volume replication service 301. Next, the local volume replication service 301 processes the pending volatile I/O operations flushed and then creates and event packet to represent the up to date state of the local source volume and sends it over a network connection to the remote volume replication service 302. In response, the remote volume replication service 302 sends an acknowledgment to the local volume replication service 301. The local volume replication service 301 then issues a thaw command to the applications permitting the applications to resume normal processing.

Example processing associated with the remote volume replication service 302 was presented above with respect to the method 200 of the FIG. 2. Specifically, the remote volume replication service 302 maintains and manages a replicate volume (replica) of the local volume and also creates and manages snapshot carved from the replica in response to event packets received from the local volume replication service 301.

Communications that the remote volume replication service 302 receives from the local volume replication service 301 are inspected to determine whether the communications are or are not associated with an event packet. Again, if associated with an event packet than a snapshot is being requested by the local volume replication service 301. If a particular communication is not associated with an event packet, then a check is made to determine if an existing event packet (snap shot request) remains unprocessed; if so the communication is cached for subsequent processing against the replica in its proper order; if not the communication is immediately processed against the replica. For communications associated with an event packet, each I/O operation identified in the event packet is processed in its proper sequence against the replica to produce the version of the local volume as a snapshot.

The data replication system 300 may also include a cache 303. The cache 303 is adapted to interact with the remote volume replication service 302 within the remote or destination environment associated with the replica and snapshots. Here, the remote volume replication service 302 utilizes the cache to buffer I/O operations not yet processed to produce the snapshot and/or to buffer subsequent I/O operations while a pending snapshot is being processed.

Figure 4:
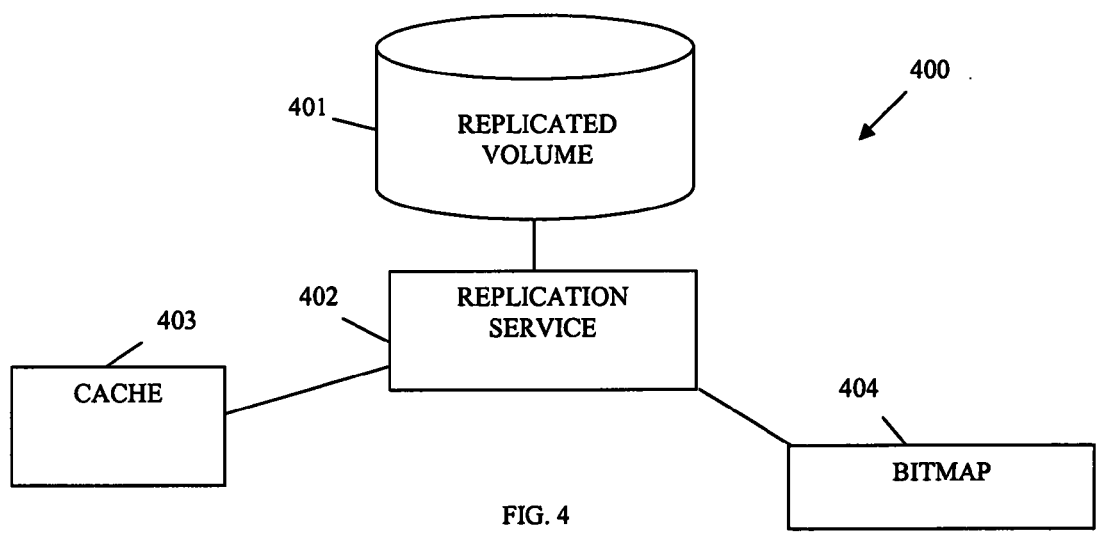
FIG. 4 is a diagram of another data replication system, according to an example embodiment.

FIG. 4 is a diagram of another data replication system 400, according to an example embodiment. The data replication system 400 is implemented in a machine-accessible and readable medium and is accessed and processed over a network. The network may be wired, wireless, or a combination of wired and wireless. The data replication system 400 implements, among other things, the remote replication service represented by the method 200 of the FIG. 2, and at least a portion of the data replication system 300 described above with reference to the FIG. 3.

The data replication system 400 includes a replicated volume 401 and a replication service 402. The data replication system 400 may also include a cache 403 and/or a bitmap data structure 404. Each of these and their interactions with one another will now be discussed in turn.

The replicated volume 401 is a remote or destination source representing an ongoing replica of a local or source volume associated with a source environment. Here, data is maintained to mirror what appears in the source volume and snapshot versions are carved out of the replicated volume 401 on a demand basis.

The replication service 402 manages the replicated volume 401 to be a replica of a local source volume. To do this, the replication service 402 interacts over a network with a local replication service. The local replication service provides at least two types of communications. One for typical I/O being processed in the typical fashion against the local volume and the replication service 402 processes these against the replicated volume 401. The second is for a snapshot request; this communication type is embodied in an event packet and includes flushed and pending I/O from application memory buffers in the source environment that were recently processed to the local volume in response to the snapshot request. Example processing associated with the replication service 401 to handle this situation was provided in detail above with reference to the method 200 of the FIG. 2 and with reference to the remote volume replication service 302 of the system 300 described above with reference to the FIG. 3.

The data replication system 400 may also include a cache 403. The cache 403. The replication service 402 uses the cache 403 to buffer I/O associated with unprocessed event packets and perhaps associated with subsequent I/O received from a local replication service while a pending snapshot request is being processed and has not yet completed.

According to an embodiment, the data replication system 400 also includes a bitmap data structure 404. The bitmap 404 may be used in situation where a cache 403 is too costly or otherwise unavailable or undesirable. The bitmap represents the data blocks associated with the I/O of an event packet. The actual data to write in the corresponding data blocks of the replicated volume 401 are acquired as needed over the network by the replication service 402 via communications with the local replication service. In this manner, a cache can be avoided altogether, if this is desired or needed.

The replication service 402 also sends acknowledgments back to the local replication service to inform it that an event packet was received. This permits the local replication service to thaw suspended applications for normal processing after a snapshot request was requested and after memory buffers were flushed by the applications and represented in the corresponding event packet. The replication service processes the I/O represented in the event packet against the replicated volume 401 to carve out and establish a snapshot version of the local volume.

One now appreciates how data replication with snapshot capabilities can be improved by quickly establishing a snapshot on a remote replica via event packet communication and alleviating the need to maintain snapshots on a local volume.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   raising a data snapshot request to one or more applications;
   receiving a flush of current pending volatile Input/Output (I/O) operations from the one or more applications;
   producing an event packet representing the up-to-date state of a local source volume, the event packet represents current pending I/O operations batched in memory buffers that are to be flushed to the local source volume, the event packet identify data blocks, block offsets, and operations to perform on a remote replicated volume, the current pending I/O operations not flushed to the local source volume when the data snapshot request is raised, the remote replicated volume is a replication of the local source volume that is being replicated by a remote replication service but lacks the current pending I/O operations in the remote replicated volume;
   sending the event packet to the remote replication service for producing a snapshot version of the local volume in the remote replicated volume by the remote replication service processing the event packet against the remote replication volume, the snapshot version of the local volume created just from the remote replicated volume using the remote replicated volume and the event packet and the snapshot version not created from the local source volume; and
   receiving a thaw command from the remote replication service indicating that one or more applications can continue to process against the local source volume, the thaw command is sent by the remote replication service on receipt of the event packet and before the remote replication service processes the event packet against the remote replicated volume to produce the snapshot version.

2. The method of claim 1, wherein receiving further includes processing the current pending volatile I/O operations against the local volume to bring a state of the local volume up to date.

3. The method of claim 1 further comprising, sending subsequent volatile I/O operations received from the one or more applications to the remote replication service for processing against the remote replication volume and simultaneously processing the subsequent volatile I/O operations against the local volume.

4. The method of claim 1, wherein raising further includes instructing the one or more applications to suspend operations after flushing the current pending volatile I/O operations until an acknowledgement is received from the remote replication service that the event packet was received and is being processed.

5. The method of claim 1, wherein receiving further includes identifying the current pending volatile I/O operations as one or more of the following: a pending write request and a pending delete request that were buffered in memory and awaiting processing against the local volume when the snapshot request was raised.

6. The method of claim 1, wherein producing further including organizing the event packet as a complete set of flushed I/O buffers used by the one or more applications.

7. A method, comprising:
   receiving an event packet from a source environment, the event packet is associated with pending volatile Input/Output (I/O) operations batched in memory buffers that were recently or just processed to a source volume within the source environment, the event packet identifies data blocks, block offsets, and operations to perform on a remote replicated volume, the pending volatile I/O operations were not flushed from the source volume when a snap shot request is initially processed on the source volume receipt of the event packet providing an indication that the snap shot is to be processed from the source volume;
   sending an acknowledgment to the source environment indicating that it is permissible for suspended applications to resume processing in the source environment and indicating the event packet was received and is being processed; and
   flushing the pending volatile I/O operations to the remote replicated volume as a snapshot version of the source volume in a remote environment from the source environment, the remote replicated volume is a replication of the source volume in the remote environment that lacks the pending volatile I/O operations, the snapshot version created just within the remote environment and not in the source environment.

8. The method of claim 7 further comprising, receiving additional I/O operations from the source environment before the flushing is completed and caching the additional I/O operations for processing against the replicated volume after the flushing completes.

9. The method of claim 7 further comprising, creating a persistent cache to house the pending volatile I/O operations associated with the event packet, wherein the pending volatile I/O operations are flushed from the persistent cache.

10. The method of claim 7 further comprising, creating a bitmap representing modified blocks of data in the source volume to represent the pending volatile I/O operations associated with the event packet and flushing from the bitmap.

11. The method of claim 7 further comprising, housing a number of the pending volatile I/O operations not yet flushed in a persistent cache when the flushing exceeds a quality of service threshold.

12. The method of claim 7, wherein flushing further includes processing each pending volatile I/O operation represented by the event packet against the replicated volume.

13. A machine-implemented system, comprising:
a non-transitory machine-readable medium configured with a local volume replication service for executing on a machine; and
the non-transitory machine-readable medium also configured with a remote volume replication service for executing on a machine, the local volume replication service is to raise snapshot requests to one or more applications processing within a local environment associated with a local volume, and the local volume replication service packages pending Input/Output (I/O) operations as part of an event packet that is to be sent to the remote volume replication service, the event packet represents an up to date state of the local volume, and the remote volume replication service is to acknowledge receipt of the event packet to the local volume replication service indicating that the local volume replication service can continue normal processing and the remote volume replication service is to then flush the pending I/O operations associated with the event packet against a remote replicated volume to create a snapshot version of the local volume, the remote replicated volume a replication of the local volume and the snapshot version created in just a remote environment where the remote replicated volume resides and not in the local environment, the event packet representing the pending I/O operations that were batched in memory buffers of the local volume representing I/O that was not flushed to the local volume when the snapshot requests were received, the event packet identifies data blocks, block offsets, and operations to perform on the remote replicated.

14. The system of claim 13 further comprising, a cache associated with the remote volume replication service, wherein the remote volume replication service is to house subsequent I/O operations issued from the one or more applications within the local environment in the cache until the pending I/O operations are completely flushed to the replicated volume.

15. The system of claim 13, wherein the local volume replication service is to suspend processing of the one or more applications until the acknowledgement is received.

16. The system of claim 13, wherein the local volume replication service is to process the I/O operations against the local volume before the event packet is sent to the remote volume replication service.

* * * * *